(No Model.)

E. S. BENHAM.
GANG PLOW FRAME.

No. 289,376. Patented Dec. 4, 1883.

Witnesses.
J. M. Caldwell.
F. W. Brown.

Inventor.
Ethan S. Benham.
By James Sangster
Atty

UNITED STATES PATENT OFFICE.

ETHAN S. BENHAM, OF ATTICA, NEW YORK.

GANG-PLOW FRAME.

SPECIFICATION forming part of Letters Patent No. 289,376, dated December 4, 1883.

Application filed May 11, 1883. (No model.)

*To all whom it may concern:*

Be it known that I, ETHAN S. BENHAM, a citizen of the United States, residing in Attica, in the county of Wyoming and State of New York, have invented certain new and useful Improvements in Gang-Plow Frames, of which the following is a specification.

My invention relates to certain improvements in the frames of gang-plows, all of which will be fully and clearly hereinafter shown by reference to the accompanying drawings, in which—

Figure 1:
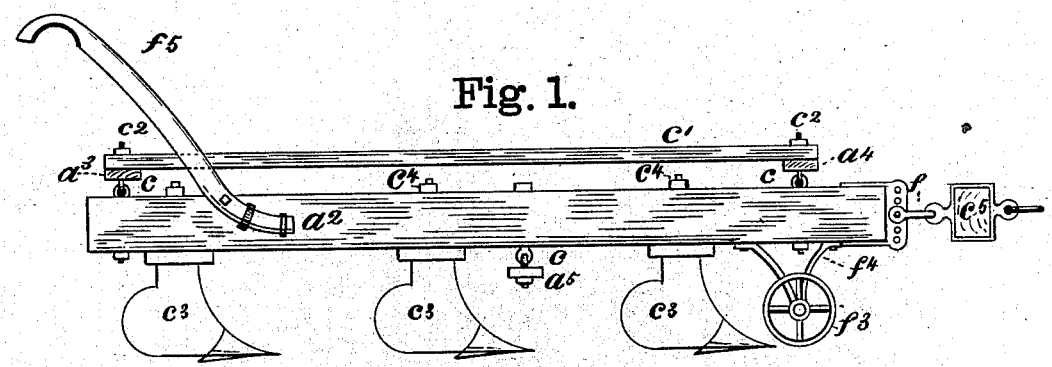
Figure 2:
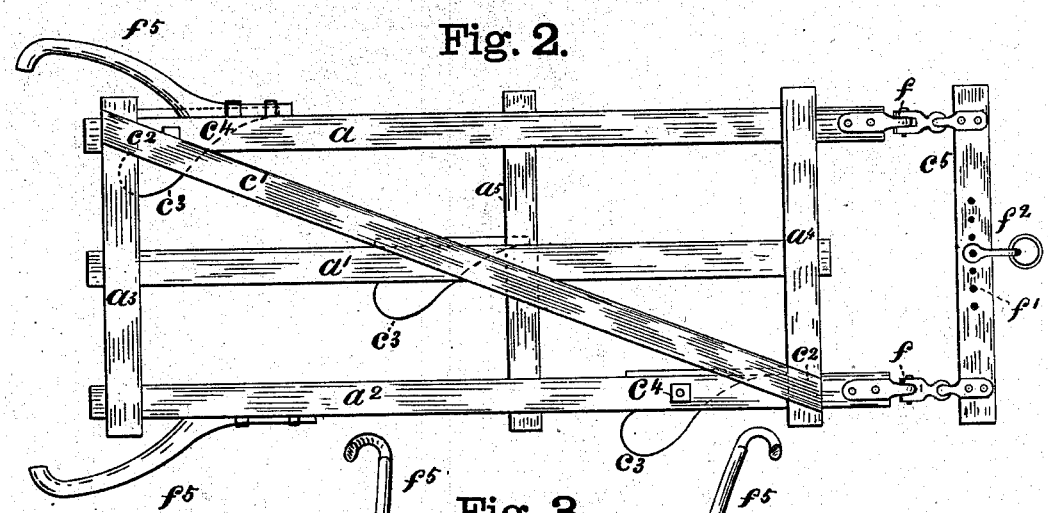
Figure 3:
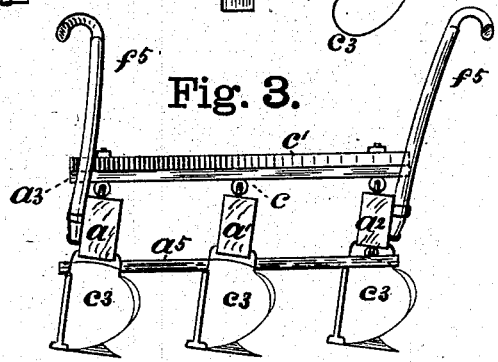

Figure 1 a side elevation. Fig. 2 is a plan or top view; and Fig. 3 represents a back end view.

The frame consists of a series of longitudinal parallel beams or bars, $a\ a'\ a^2$, and a series of cross-bars, $a^3\ a^4\ a^5$. These bars are securely held together by eyebolts $c$, so that the frame is capable of a movement back and forth sidewise. On the top of the frame is a diagonal brace, $c'$, rigidly fastened to the cross-bars $a^3\ a^4$ by bolts $c^2$, or in any other equivalent way, for the purpose of holding the bars $a^3\ a^4$ parallel and keeping the frame in position. The plows $c^3$ are rigidly secured to the under part of the beams by bolts or other similar means, $c^4$, and any kind of plow adapted for plowing may be used. The front part of the frame is provided with a draw-bar, $c^5$, connected to it by the usual clevises, $f$. On the bar $c^5$ is a series of holes, $f'$, through either of which the clevis $f^2$ may be secured for the purpose of adjusting or changing the draft when required. Under the front ends of each of the bars $a\ a^2$ is secured a wheel, $f^3$, arranged in boxes in the frame $f^4$ in the usual way. The handles $f^5$ are secured to the machine in any suitable or well-known way. In gang-plows it is usual to have them attached to a rigid frame, so that they cannot be tipped to either side, like a single plow.

By my invention a gang of plows may be as readily handled as a single plow, and may be tipped to either one side or the other without changing the depth of the plows in the ground, thereby lessening the draft, and causing the plows to be as easily held and guided as a single plow. When one plow moves to one side, all of the plows in the gang partake of the same movement, (see Fig. 3, in which the plows are shown turned slightly to the right,) but they may be turned either way more or less, thereby adapting them to be used on side-hills or on uneven ground.

In place of the diagonal bar $c'$ a rigid frame secured to the bars $a^3\ a^4$ may be used and any well-known means may be used, in place of the eyebolts for securing a movable joint.

I claim as my invention—

A gang-plow frame consisting of the longitudinal bars $a\ a'\ a^2$, jointed to the cross-bars $a^3\ a^4\ a^5$, substantially as specified, in combination with the diagonal bar $c'$, handles $f^5$, and plows $c^3$, all arranged for joint operation, substantially as and for the purposes described.

ETHAN S. BENHAM.

Witnesses:
J. M. CALDWELL,
JAMES SANGSTER.